May 12, 1931. H. T. KRAFT 1,804,993
STEERING WHEEL
Filed April 18, 1929 3 Sheets-Sheet 1
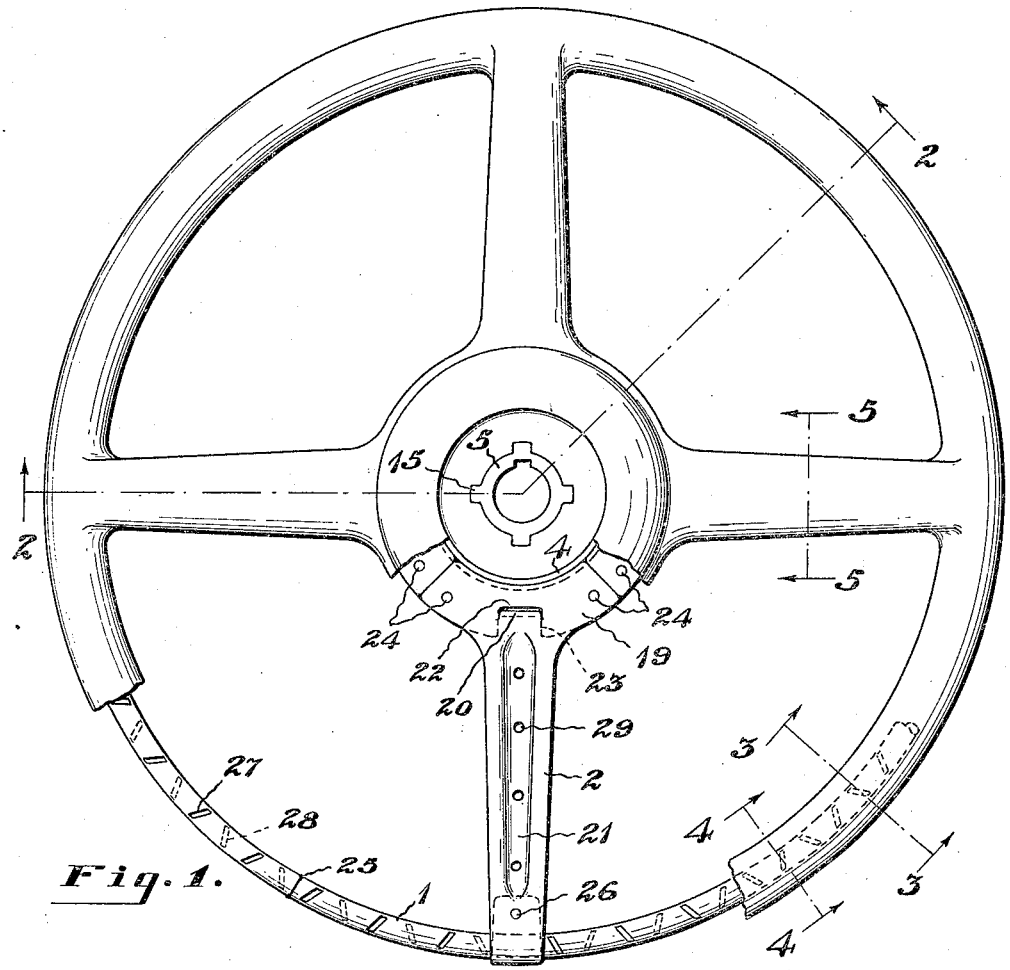
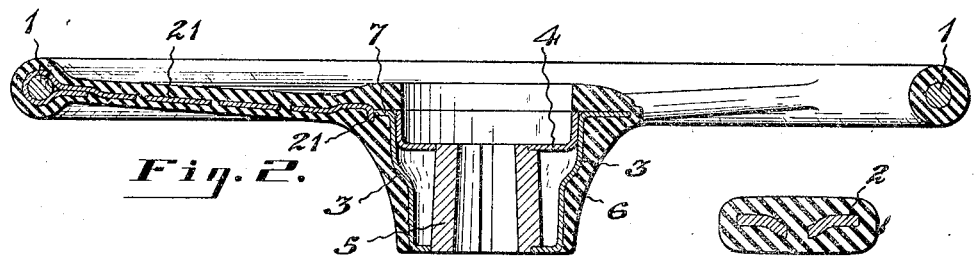
INVENTOR
HERMAN T. KRAFT
BY
Evans & McCoy
ATTORNEYS INVENTOR
HERMAN T. KRAFT
BY
Evans + McCoy
ATTORNEYS Patented May 12, 1931

1,804,993

UNITED STATES PATENT OFFICE

HERMAN T. KRAFT, OF AKRON, OHIO, ASSIGNOR TO THE H. A. HUSTED COMPANY, OF DETROIT, MICHIGAN, A CORPORATION OF MICHIGAN

STEERING WHEEL

Application filed April 18, 1929. Serial No. 356,106.

This invention relates to steering wheels and particularly to wheels of the reinforced composition type adapted for use in motor vehicles, motor boats, airplanes and the like.

The principal object of the present invention is to provide a reinforced composition steering wheel with a metallic reinforcing spider which is sturdy in construction, light in weight, and economical to manufacture.

Another object is to provide a reinforced composition steering wheel with a reinforcing spider having an improved hub portion.

Another object is to provide a reinforced composition steering wheel having a very rigid driving connection between the wheel hub and reinforcing spider.

A further object is to provide a reinforced composition steering wheel with a reinforcing spider having nested cup-shaped hub stampings, and a tubular hub member positioned between the cup-shaped stampings and having a rigid driving connection with both stampings.

These being among the objects of the present invention, the same consists of certain features of construction and combination of parts to be hereinafter described with reference to the accompanying drawings and then claimed, having the above and other objects in view.

In the drawings which illustrate a suitable embodiment of the present invention, Figure 1 is a plan view of a composition steering wheel, portions of the composition material being broken away to clearly show the construction of the reinforcing spider.

Figure 2 is a transverse section taken on the line 2—2 of Figure 1.

Figure 3 is an enlarged section through the rim of the wheel taken on the line 3—3 of Fig. 1.

Figure 4 is an enlarged section through the rim of the wheel taken on the line 4—4 of Fig. 1.

Figure 5 is an enlarged transverse section through one of the spokes of the wheel taken substantially on the line 5—5 of Fig. 1.

Figure 6:
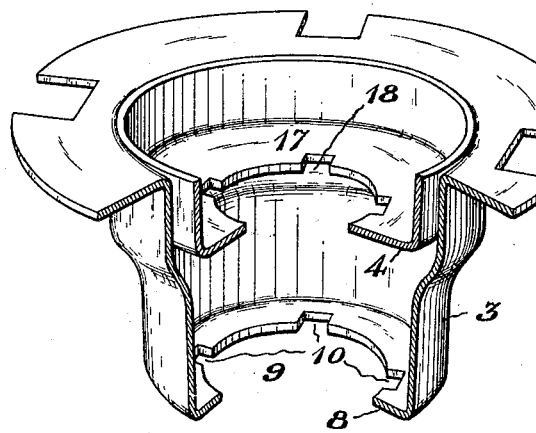
Figure 6 is an enlarged fragmentary perspective view of the cup shaped hub members in assembled position, but without the hub casting assembled thereto.

Referring to the accompanying drawings in which like numerals refer to like parts throughout the several views, the steering wheel principally comprises a reinforcing spider built up of a continuous rim 1, spokes 2, outer and inner hub receiving members 3 and 4, and tubular hub element 5, which is embedded in a body 6 of initially plastic composition material.

Referring to Figure 6, the outer hub receiving member 3 is preferably formed from a single piece of sheet metal to a cup-shaped stamping having an outwardly extending circumferential flange 7 at its upper edge and an inwardly extending flange 8 at its lower edge which defines a central opening 9. The inwardly extending flange 8 is formed with a plurality of radial notches 10 which are for a purpose that will be later described.

Figure 7:
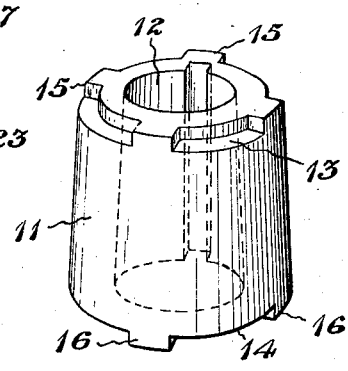
Figure 7 is an enlarged perspective view of the tubular hub member for the reinforcing spider.

A separately formed hub member 11 having a tapered central opening 12, is cast with a spaced circumferential depressions 13 and 14 at opposite ends thereof which respectively provide driving lugs 15 and 16 which are flush with the outer face thereof and which are also flush with the end faces of the hub as shown in Figure 7. This may better be described by saying that the intersections of the outer axial face and end faces are rabbeted out at spaced places to provide the lugs 15 and 16.

The hub member 11 formed in this manner is positioned in the cup-shaped stamping 3 with the lugs 16 extending into the notches 10 in the flange 8 and with the bottoms of the grooves 14 abutting against the flange 8 as shown in Figure 2, the lugs 16 being of sufficient width to allow the same to fit in the notches 10.

The inner hub receiving member 4 is also formed from a single piece of sheet metal into a shallow cup-shaped stamping of substantially the same diameter as the inside diameter of the member 3, and is provided with an inwardly extending flange 17. Radial notches 18 are also formed in the flange 17 as shown in Figure 6. This hub receiving member 4 is driven into the hub receiving member 3 with a press fit and is preferably welded to the wall of the member 3, the flange 18 thereof being seated on the bottoms of the grooves 13 of the hub 11 with the lugs 15 of the hub 11 extending through the notches 18 of the flange 17 substantially as shown in Figure 2. The flanges 8 and 17, if desired, may be welded to the hub 11.

This comprises the hub portion of the reinforcing spider and it is plainly evident that a very rigid and economical construction is provided. The lugs 15 and 16 which engage the notched flanges of the hub receiving members 3 and 4 provide a very rigid driving connection between the steering wheel and separately formed hub 11.

Each spoke 2, as shown in Figures 1 and 2, is stamped from a single piece of sheet metal to provide the same with a quadrantal hub engaging segment 19 and a downwardly extending tongue 20 spaced somewhat rearwardly of the marginal edge of the hub engaging segment 19 and positioned on the longitudinal centerline of the spoke 2. Each spoke 2 is further formed with a longitudinal corrugation or depression 21 positioned midway between its sides and extending to the slot 22 formed by striking down the tongue 20, in order to lend additional strength and rigidity to the spoke.

The spokes 2 thus formed are positioned on the outwardly projecting flange 7 of the outer hub receiving member 3 with the tongues 20 positioned between the sides of and seating against the bottoms of radial slots 23 formed in the outwardly extending flange 7, and with the ends of the segmental portions 19 of each spoke 2 abutting against the ends of the segmental portions of the next adjacent spokes. The spoke segments 19 are preferably welded to the flange 7, as indicated by the weld marks 24, although they may be riveted or otherwise secured thereto if desired. The downwardly extending tongues 20 of the spokes 2 form, in effect, driving lugs between the spokes and hub portion of the steering wheel, to relieve the welded connection between the spokes 2 and flange 7 of any unnecessary strain.

The rim element 1 is preferably formed of round bar stock bent into circular form and welded at its ends as indicated by the numeral 25. The ends of the spokes 2 are bent around the rim 1 and back upon themselves as shown in Figs. 1 and 2 and spot welded at 26 to hold the rim rigidly in position. Rivets or bolts may, however, be used to secure the extreme ends of the spokes to the body portion thereof if desired. The rim 1 is preferably formed with a plurality of slots 27 around its upper face and a plurality of slots 28 around its lower face to provide roughened surfaces so that the composition body 6 can be easily bonded thereto.

The reinforcing spider formed in this way is then supported in a cavity in a suitable mold, the cavity conforming in shape to the shape of the wheel to be produced, and initially plastic composition material is molded around and bonded or vulcanized to all parts of the spider. The spider is thus completely embedded in the composition body 6 with the exception of the end faces of the hub 5, as shown in Fig. 2. The composition body is continuous throughout the rim, spokes and hub portion of the wheel to provide a wheel which is very neat in appearance and strong in construction. A plurality of perforations 29 may be provided in the spokes 2 so that the composition body 6 may be integrally united through the spokes.

It is apparent from the drawings and foregoing description that a steering wheel is provided which is very neat in appearance and rigid in construction, and that a novel and economical hub construction is provided.

Figure 8:
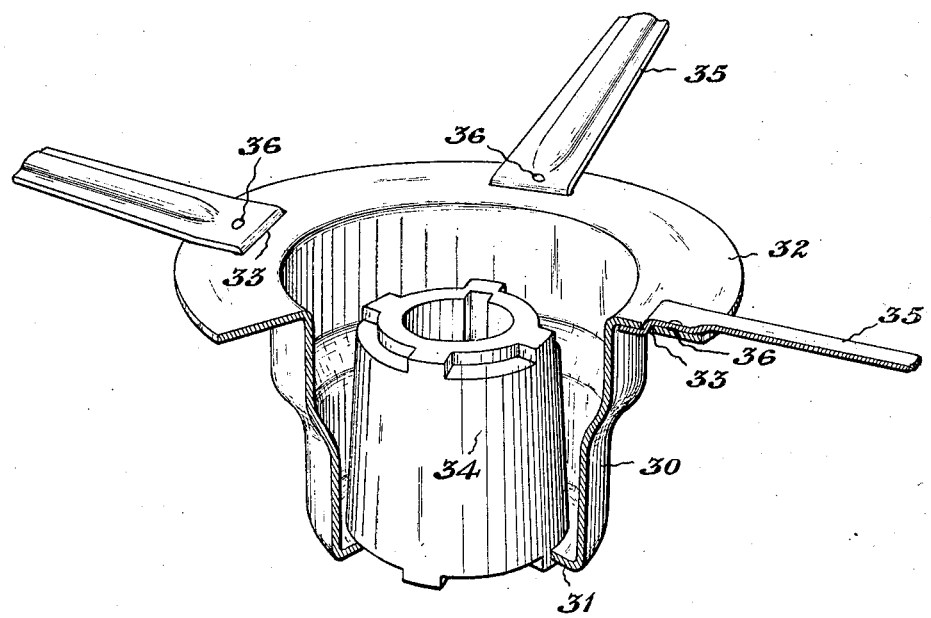
Figure 8 is a fragmentary perspective view of a modified form of reinforcing spider, showing the hub member seated in the lower hub stamping, the upper stamping being removed.

The modified spider illustrated in Figure 8 is very similar to the construction previously described, it being provided with an outer hub receiving member 30 having a lower inturned flange 31 which is notched out at spaced intervals, and an upper outwardly extending flange 32 which is provided with a plurality of spaced slots 33, all of which lie on substantially the same circumference. A separately formed tubular hub member 34 identical to the hub 11 previously described is positioned within the member 30 and has engagement therewith. A cup-shaped inner hub receiving member (not shown) identical in construction to the hub member 4 previously described is driven into the hub receiving member 30 to engage the hub 34 and nest therewith. The inner ends of the spokes 35 are flanged downwardly and then inwardly as shown, and extend into the slots 33, the upper faces of the inwardly flanged portions of the spokes being seated against the lower face of the flange 32, and the lower faces of the spokes adjacent the downwardly flanged portions being seated on the upper face of the flange 32. The spokes 35 are preferably welded to the flange 32 as indicated at 36, although they maye be riveted if desired.

Figure 9:
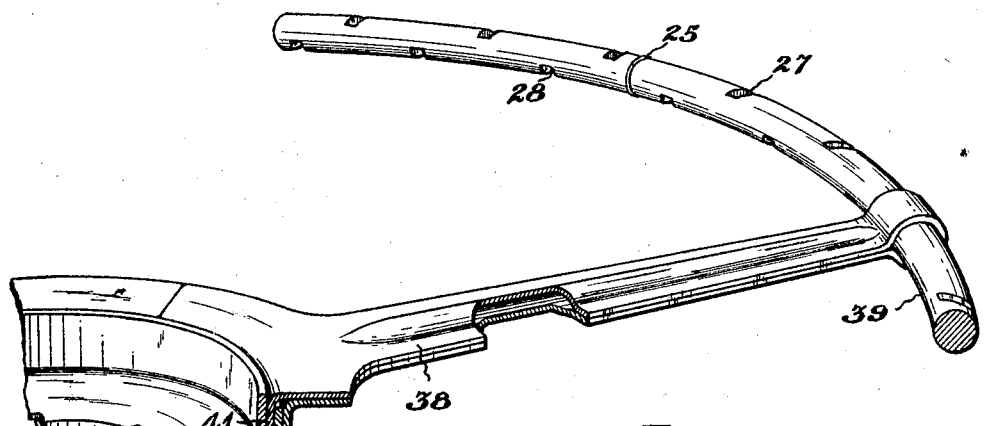
Figure 9 is a fragmentary perspective view of another modified form of reinforcing spider, the hub member being removed from the same.

In Figure 9 another modified reinforcing spider is shown to comprise an outer cup-shaped hub receiving member 37 and spokes 38 which are bent around the rim 39 intermediate their ends and bent back upon themselves to provide a double thickness of metal. The inner flared ends of the bent back portions of the spokes 38 are flanged downwardly, one flange 40 being positioned outwardly of the upper surface of the hub receiving member 37 and the other flange 41 being positioned inwardly of the member 37. In other words, the flanged ends of the bent back portions of the spokes 38 are spaced apart and the upper edge portion of the hub receiving member 37 is received between the same. The inner hub receiving member 42 similar to the member previously described seats against the inner surfaces of the flanges 41. A hub member (not shown) such as that previously described in connection with Figure 7 is positioned between the hub receiving members and has rigid engagement therewith. The several parts are preferably spot welded together to provide a very rigid structure. It can be seen in this construction that it would be practically impossible for the rim to break away from the spokes.

Figure 10:
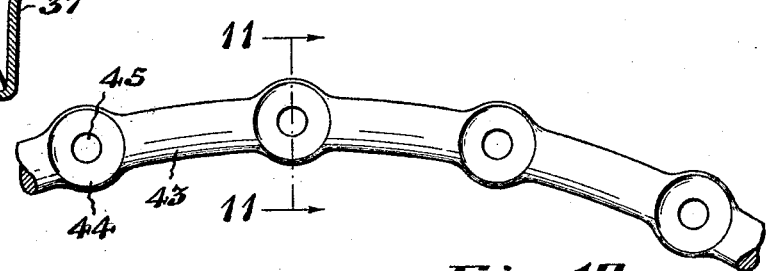
Figure 10 is a fragmentary plan view of a modified form of rim element for the reinforcing spider.
Figure 11:
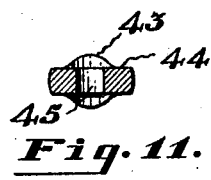
Figure 11 is a transverse section of the modified form of rim element taken on the line 11—11 of Fig. 10.

The modified rim construction shown in Figures 10 and 11, comprises a rim 43 of bar stock which is formed with a plurality of spaced flattened portions 44 that are drilled with openings 45. It is evident that the purpose of the openings 45 are to integrally unite the composition material which is molded around the same in the completed steering wheel.

Aside from the specific embodiments of the invention herein shown and described, it will be understood that numerous details of construction may be altered and omitted without departing from the spirit and scope of this invention, and it is not intended to limit the invention to the exact construction set forth, as it is desired to claim the invention broadly as well as specifically, as indicated in the appended claims.

What I claim is:

1. In a steering wheel spider, a hub portion therefor, comprising an outer cup-shaped member, an inner cup-shaped member nested in said outer member and a tubular hub positioned between said cup-shaped members and having lugs at opposite ends thereof engaging the bottoms of said cup-shaped members.

2. In a steering wheel spider, a hub portion therefor, comprising an outer cup-shaped member having an inwardly extending flange at one end and radial notches in said flange, an inner cup-shaped member having an inwardly extending flange and radial notches in said flange, and a hub positioned between said cup-shaped members and having lugs at its opposite ends projecting through and engaging said notches in said flanges to provide a driving connection between said hub and cup-shaped members.

3. In a steering wheel spider, a hub portion therefor, comprising an outer tubular member, a flange bent radially inwardly at the bottom of said tubular member, radial notches in said flange, a tubular hub having radial lugs at opposite ends thereof, and rabbeted portions between said lugs, the radial faces of said rabbeted portions at one end of said hub being seated on said flange and said lugs extending through said notches, and an inner tubular member having an inturned radial flange provided with radial notches, said inner member being nested with said outer member, the flange of said inner member being seated on the radial faces of the rabbeted portions at the other end of said hub and the lugs at this end being extended through the notches in said inner member to provide a driving connection between said hub and steering wheel spider.

4. In a steering wheel spider, a hub stamping having an outwardly extending circumferential flange, radial notches in said flange, and a plurality of spokes secured to said flange, each having a projecting tongue extending through one of said notches in said flange to provide a driving connection between said spokes and hub stamping.

5. In a steering wheel spider, a hub stamping having an outwardly extending circumferential flange, radial notches in said flange, a plurality of spokes secured to said flange with the inner ends thereof in abutting relationship, and a driving connection between said spokes and hub stamping comprising integral tongues on said spokes perpendicular thereto extending through said notches in said flange and engaging the walls thereof.

6. In a steering wheel spider, an outer hub stamping, an inner hub stamping nested therewith, a tubular hub positioned between said stampings and having a rigid driving connection with each, a radial flange extending outwardly from said outer hub stamping and having a plurality of notches therein, a circular rim, and a plurality of spokes having projecting tongues extending through said notches to provide driving connections between said spokes and hub stamping, the outer ends of said spokes being bent around and secured to said rim, and the inner ends of said spokes being secured to said flange in abutting relationship with adjacent spokes.

7. A steering wheel comprising an outer hub stamping, an inner hub stamping nested therewith, a tubular hub positioned between said stampings and having a rigid driving connection with each, a radial flange extending outwardly from said outer hub stamping and having a plurality of notches therein, a circular rim, a plurality of spokes having projecting tongues extending through said notches to provide driving connections between said spokes and hub stamping, the outer ends of said spokes being bent around and secured to said rim, and the inner ends of said spokes being secured to said flange in abutting relationship with adjacent spokes and a composition body molded around said outer hub stamping, spokes and rim to embed the same.

8. In a steering wheel spider, an outer hub stamping, an inner hub stamping nested therewith, an axially bored hub positioned between said stampings and having a rigid driving connection with each, a radial flange extending outwardly from said outer hub stamping and having a plurality of notches therein, and a plurality of spokes secured to said flange and having projecting tongues extending through said notches to provide driving connections between said spokes and hub stamping.

9. In a steering wheel spider, an outer hub stamping, an inner hub stamping nested therewith, an axially bored hub positioned between said stampings and having a rigid driving connection with each, a radial flange extending outwardly from said outer hub stamping and having a plurality of notches therein, a plurality of spokes secured to said flange and having projecting tongues extending through said notches to provide driving connections between said spokes and hub stamping, and a body of composition material embedding said spokes and extending around the exterior surface of said outer hub stamping.

In testimony whereof I affix my signature.

HERMAN T. KRAFT.